(12) United States Patent
Kahlon et al.

(10) Patent No.: US 6,233,935 B1
(45) Date of Patent: May 22, 2001

(54) METHOD AND APPARATUS FOR STARTING AN ENGINE HAVING A TURBOCHARGER

(75) Inventors: Gurinder Singh Kahlon, Canton; Ning Liu, Novi; Robert Joseph Mohan, Canton, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/455,686

(22) Filed: Dec. 7, 1999

(51) Int. Cl.⁷ .............................. F02B 37/00; F02N 11/00
(52) U.S. Cl. ................................. 60/605.1; 123/179.5
(58) Field of Search .................... 60/605.1, 607, 60/608; 123/179.12, 179.5, 179.16, 179.17

(56) References Cited

U.S. PATENT DOCUMENTS

| | | | |
|---|---|---|---|
| 1,752,224 | * | 3/1930 | Apple ........................... 60/607 |
| 2,585,029 | * | 2/1952 | Nettel ........................... 60/607 |
| 2,654,991 | * | 10/1953 | Nettel ........................... 60/608 |
| 3,676,999 | * | 7/1972 | Oldfield ........................ 60/608 |
| 4,699,097 | | 10/1987 | Tanaka et al. . |
| 4,803,376 | | 2/1989 | N'Guyen . |
| 5,020,491 | | 6/1991 | Mashino . |
| 5,033,425 | | 7/1991 | Kadomukai et al. . |
| 5,075,616 | | 12/1991 | Mitsui . |

FOREIGN PATENT DOCUMENTS

| | | | | |
|---|---|---|---|---|
| 3-202632 | * | 9/1991 | (JP) ........................... 60/608 |
| 4-342828 | * | 11/1992 | (JP) ........................... 60/608 |
| 5-231163 | * | 9/1993 | (JP) ........................... 60/608 |

\* cited by examiner

Primary Examiner—Michael Koczo
(74) Attorney, Agent, or Firm—Mark S. Sparschu

(57) ABSTRACT

A system (40) for starting an internal combustion engine (12) of an automotive vehicle (10) has a controller (54) coupled to a starter/alternator (42). The engine (12) has a crankshaft (50) and a turbocharger (24). The controller (54) initiates the starting of the engine (12) by rotating the crankshaft (50). The rotating crankshaft (50) displaces an amount of air from the cylinders (14) of the engine (12) to rotate the rotor shaft of the turbocharger (21). The turbocharger (25) thus draws in air, compresses the air and provides the compressed air to the cylinders (14). When the engine is started the initial power is increased due to the compressed air.

18 Claims, 1 Drawing Sheet

METHOD AND APPARATUS FOR STARTING AN ENGINE HAVING A TURBOCHARGER

TECHNICAL FIELD

The present invention relates generally to internal combustion engines for automotive vehicles, and more specifically, to an automotive vehicle having a starter/alternator and a turbocharger coupled to the engine.

BACKGROUND

Automotive vehicles with internal combustion engines are typically provided with both a starter motor and alternator. In recent years, a combined alternator and starter motor has been proposed. Such systems have a rotor mounted directly to the crankshaft of the engine and a stator sandwiched between the engine block and the bell housing of the transmission. During initial startup of the vehicle, the starter/alternator functions as a starter. While functioning as a starter, the starter/alternator rotates the crankshaft of the engine while the cylinders are fired.

After the engine is started, the starter/alternator is used as a generator to charge the electrical system of the vehicle.

Many vehicles have turbochargers incorporated with the engine. These turbochargers are commonly referred to as exhaust-gas turbochargers. A turbocharger consists of two machines: a turbine and a compressor mounted on a common shaft. The turbine is coupled to the exhaust system and uses the energy obtained in the flow of the exhaust system to drive the compressor. The compressor in turn, draws in outside air, compresses it and supplies it to the cylinders. The compressed air increases the power output of the engine.

Exhaust gas turbochargers operate using the mass flow of the exhaust gas. Thus, some time is associated with providing enough exhaust gas to rotate the turbocharger at a sufficient speed to provide compression at the output of the turbocharger. Such time is typically referred to as turbo lag. During turbo lag the engine output power is less than that when the turbocharger is operating.

In foreseeable automotive applications, the engine may be shut down during stops (e.g., red lights). When the accelerator is depressed, the starter/alternator starts the motor and the engine will resume firing. Thus, many startups may occur over the course of a trip.

It would therefore be desirable to reduce the amount of turbo lag and thus increase the amount of power of the engine during startup.

SUMMARY OF THE INVENTION

It is therefore one object of the invention to increase the power output of the engine during startup.

In one aspect of the invention, a method of controlling the starting of an internal combustion engine having a starter coupled to the crankshaft of the engine and a turbocharger comprises the steps of: rotating the shaft of the turbocharger to a predetermined speed and starting the engine when the turbocharger reaches the predetermined speed.

In a further aspect of the invention, a system for an automotive vehicle comprises an internal combustion engine having a crankshaft coupled to pistons. A turbocharger has a rotor that is fluidically coupled to the pistons. A starter/alternator is coupled to the crankshaft of the engine. A controller is coupled to the starter/alternator to initiate the rotation of the crankshaft to displace air from the pistons and rotate the rotor of the turbocharger. The controller starts the engine upon the rotor reaching a predetermined speed.

One advantage is that power from the engine may be increased at startup.

Other objects and features of the present invention will become apparent when viewed in light of the detailed description of the preferred embodiment when taken in conjunction with the attached drawings and appended claims.

DESCRIPTION OF THE PREFERRED EMBODIMENT

The present invention is described with respect to a particular configuration of a starter/alternator. However, the teachings of the present invention may be applied to various starters for internal combustion engines.

Figure 1:
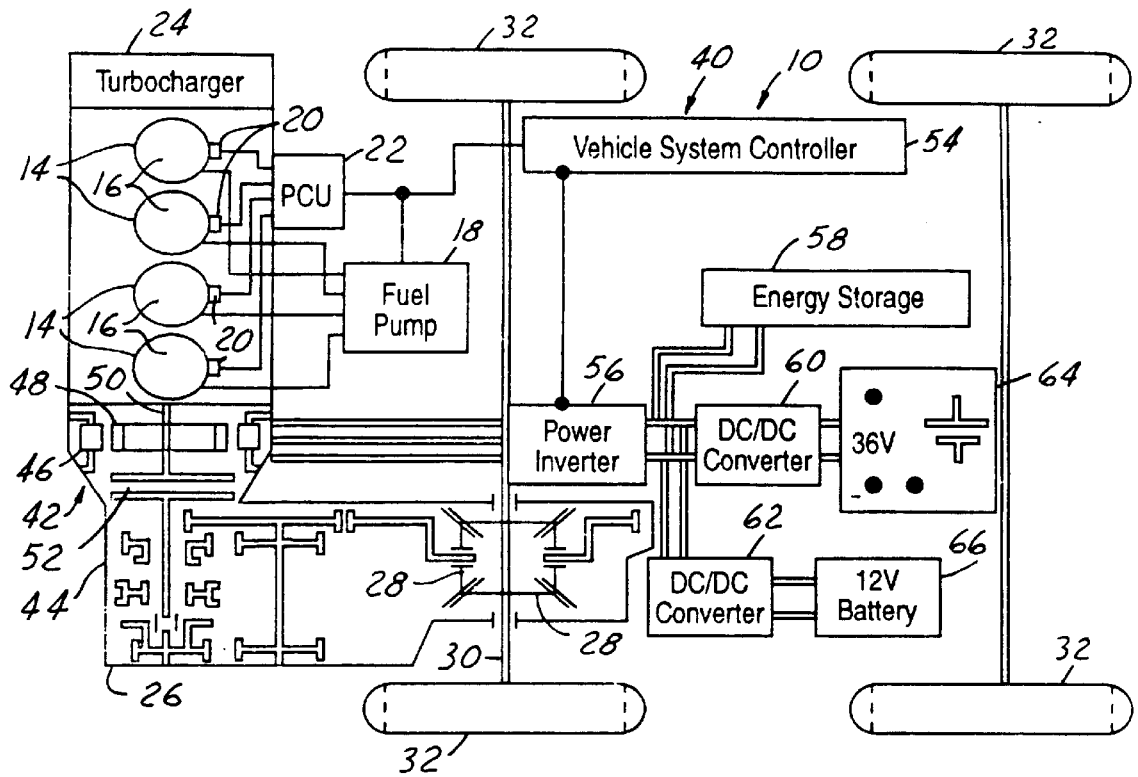
FIG. 1 is a schematic view of an automotive vehicle having a starter/alternator system according to the present invention.

Referring now to FIG. 1, an automotive vehicle 10 is illustrated having an internal combustion engine 12 having cylinders 14 with pistons 16 located therein. Each cylinder 14 is coupled to a fuel pump 18 through a fuel injector (not shown) or other fuel delivery system. Each cylinder 14 also has a spark plug 20 or other ignition source coupled to a powertrain control unit. A powertrain control unit 22 controls the ignition timing and fuel pump operation 18 in a conventional manner subject to the improvements of the present invention.

Engine 12 has a turbocharger 24 coupled to the exhaust system (shown below in FIG. 2) of engine 12. Thus, turbocharger 24 is commonly referred to as an exhaust gas turbocharger. Also, the present invention applies to superchargers as well. Turbocharger as used herein refers to both.

Engine 12 is coupled to a transmission 26. Transmission 26 may be automatic, manual or continuously variable. Transmission 26 is coupled to a differential 28 to drive an axle 30 to provide power to wheels 32. Of course, the present invention is also applicable to four wheel drive systems in which all of the wheels 32 are driven. A starter/alternator system 40 that includes a starter/alternator 42 and its associated control electronics is coupled to engine 12. In the present invention, starter/alternator 42 is positioned between a housing 44 of transmission 26 and the engine 12. Starter/alternator 42 has a stator fixedly attached to bell housing 44 and a rotor 48 coupled to a crankshaft 50 of engine 12. A clutch 52 is used to engage and disengage engine 12 from transmission 26. As will be further described below, starter/alternator 42 is used as a starter during engine startup and as an alternator to supply power to recharge the batteries of the vehicle and to supply electrical loads. Clutch 52 allows starter/alternator 42 to start the engine prior to engagement of the transmission.

Starter/alternator system 40 has a system controller 54 that is coupled to powertrain control unit 22 and to a power inverter 56. In practice, the power inverter 56 and system controller 54 may be contained in a single package. The inverter 56 is used to convert DC power to AC power in the startup mode and AC power to DC power in power generation mode as will be further described below.

Power inverter 56 is coupled to an energy storage device 58 such as an ultra capacitor, a first DC to DC converter 60, and a second DC to DC converter 62. DC to DC converter 60 is coupled to a 36 volt battery 64. DC to DC converter 62 is coupled to a 12 volt battery 66. Of course, the actual battery voltage is dependent on the particular system to which it is attached.

Figure 2:
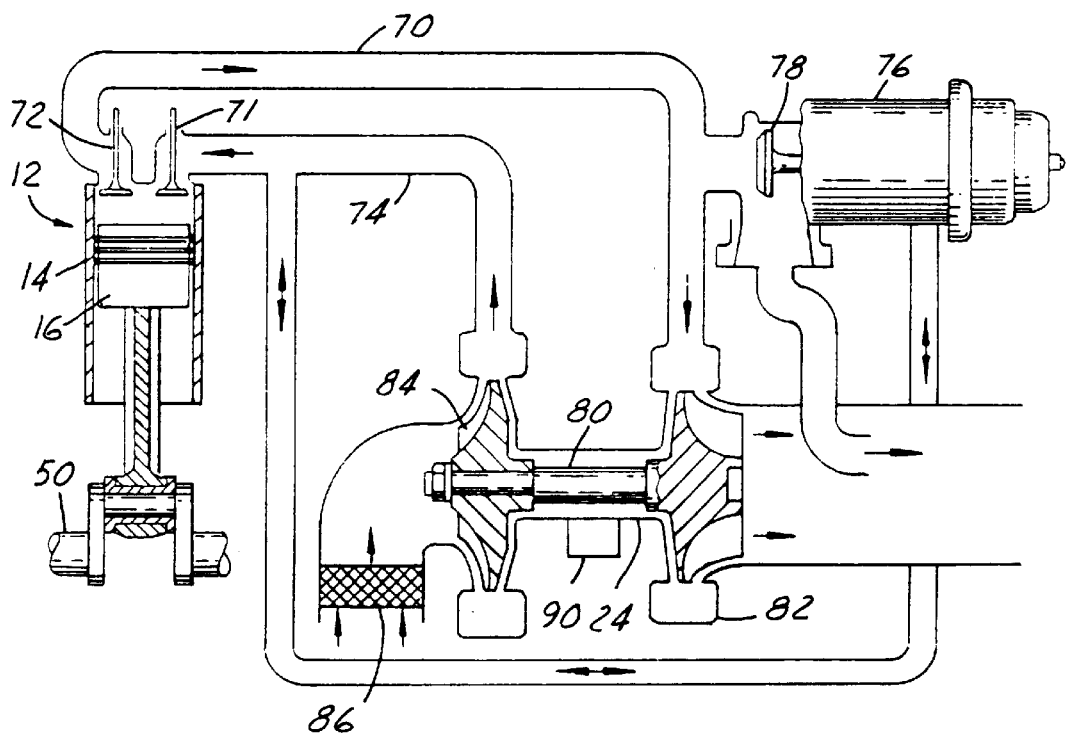
FIG. 2 is a schematic view of a piston of the engine with a turbocharger fluidically coupled thereto.

Referring now to FIG. 2, a turbocharger 24 is shown coupled to an exhaust system 70 of engine 12 with cylinders 14 and a piston 16. Only one cylinder 14 and piston 16 is shown for simplicity. Piston 16 is coupled to crankshaft 50. Gasses are input and exhausted from cylinders 14 by valves 71, 72, respectively. Although two valves are illustrated, the present invention applies to multi-valve engines. Turbocharger 24 is also coupled to an air intake system 74. A waste gate 76 having a piston 78 may be used to control the pressure into turbocharger 24 by diverting an amount of exhaust gas as is commonly known in the art. Waste gate 76 is a bypass around turbocharger 24.

Turbocharger 24 has a common rotor shaft 80 that couples the turbine portion 82 to compressor portion 84 of turbocharger 24. As gasses move from within cylinder 14 through exhaust system 70, the turbine portion 82 is caused to rotate which in turn through rotor shaft 80 causes compressor portion 84 to rotate. Compressor portion 84 draws in external air through a filter element 86 of an air induction system and compresses the air to force the air into cylinder 14. This compression causes the power output of engine to increase. However, the power is not increased until a sufficient amount of airflow through exhaust system 70 is established. In prior systems, the airflow was exhaust gasses.

In certain operating conditions of a motor vehicle, it may be desirable to provide a greater amount of power from engine upon startup. The present invention is particularly applicable to systems in which the engine is completely shut down when the vehicle is at rest, such as at a stop light. In such a system, upon immediate depression of the acceleration pedal a great amount of power is required. The starter/alternator provides the required power in a substantially shorter time then the engine firing.

In operation, the rotor shaft 80 of the turbocharger 24 is spun to provide power upon startup of the vehicle. The rotor shaft 80 of turbocharger 24 is rotated to a predetermined speed that allows the compressor portion 84 to increase the power of the engine. The starting process of engine 12 is initiated by a key placed in the ignition position or the depression of the accelerator pedal (not shown). Thirty-six volt battery 64 provides electrical power for starter/alternator 42 which is stepped up to 300 volts by DC to DC converter 60. The 300 volts is used to charge energy storage 58. Inverter 56 converts the DC power to three-phase AC power. The AC power is supplied to the stator 46 of starter/alternator 42. The starter/alternator 42 rotates rotor 48 which in turn rotates crankshaft 50 of engine 12. During the startup process, the valves 71, 72 are alternately placed in the open position and closed position depending on the position of the crankshaft which in turn is coupled to the camshaft (not shown) driving the valves. The rotation of crankshaft 50 and thus the movement of the pistons 16 causes an amount of air to be displaced into exhaust system 70.

The starter/alternator 42 is used to displace a sufficient amount of air (i.e., mass airflow) to turn rotor shaft 80 by rotation of the turbine portion 82 of turbocharger 24. The compressor portion 84 in turn compresses intake air and provides it to cylinder 14. As rotor shaft 80 turns, the power input to engine 12 will be increased upon startup of the engine. When the rotor shaft 80 of turbocharger 24 reaches a predetermined speed, the engine 12 is started by supplying fuel through fuel pump 16 and controlling the spark timing through spark plugs 20 through powertrain control unit 22. Thus, as the engine is started, the turbocharger is increasing the power to engine 12. The speed of rotor shaft 80 may be measured directly by using a sensor 90 coupled to rotor shaft 80. Thus, upon rotor shaft 80 reaching a sufficient speed, the controller 54 may trigger the starting of the combustion process in the engine.

Another method for determining the approximate speed of rotor shaft 80 is by inferring the speed by the amount of time that the engine and thus the pistons 16 have been displacing air into the exhaust system 70. Because the cylinders 14 contain a predetermined volume, the volume and thus the mass airflow of air into the turbine portion 82 of turbocharger 24 may be inferred. The time may be measured by system controller 54.

Once the turbo rotor is turning at a sufficient speed and the engine combustion process is initiated, the starter/alternator 42 is used in a generating mode. In the generating mode, the energy storage system 58, and batteries 64, 66 are monitored to determine whether they are fully charged. If any of the energy storage sources drop below a predetermined range, three-phase power from starter/alternator 42 is converted to 300 volts DC by power inverter 56. DC to DC converters 60, 62 are used to convert the 300 volts DC to 42 volts and 14 volts respectively. It should be noted that the ultra capacitors of energy storage 58 are charged directly by power converter 56.

While particular embodiments of the invention have been shown and described, numerous variations and alternate embodiments will occur to those skilled in the art. Accordingly, it is intended that the invention be limited only in terms of the appended claims.

What is claimed is:

1. A method of controlling the starting of an internal combustion engine having a starter coupled to the crankshaft of the engine and a turbocharger having a rotor, said method comprising the steps of:

rotating the rotor of the turbocharger to a predetermined speed; and starting the engine when the turbocharger reaches the predetermined speed.

2. A method as recited in claim 1 wherein the step of rotating the rotor shaft comprises the step of generating a mass airflow from the engine and coupling the mass airflow to said rotor shaft of the turbocharger.

3. A method as recited in claim 2 wherein the step of rotating the rotor shaft comprises rotating the crankshaft of the vehicle with a starter and wherein the step of generating a mass airflow comprises the step of displacing air by moving pistons coupled to the crankshaft.

4. A method as recited in claim 1 wherein the step of starting the engine comprises the step of operating the fuel pump; and providing fuel to cylinders of the engine.

5. A method as recited in claim 1 further comprising the step of determining the approximate speed of the rotor shaft of the turbocharger from the length of time that the crankshaft has been rotated.

6. A method as recited in claim 1 further comprising the step of generating power from the starter after the step of starting the engine.

7. A method of starting a vehicle with a starter, and a turbocharger and an internal combustion engine comprising the steps of:

rotating the crankshaft of the engine with the starter;

moving pistons in a respective cylinder;

displacing air into the exhaust system with the piston;

rotating a shaft of the turbocharger with the displaced air to a predetermined speed; and starting the engine when the turbocharger reaches the predetermined speed.

8. A method as recited in claim 7 wherein the step of rotating the rotor shaft comprises the step of generating a mass airflow from the engine and coupling the mass airflow to said rotor shaft of the turbocharger.

9. A method as recited in claim 7 wherein the step of starting the engine comprises the step of operating the fuel pump; and providing fuel to cylinders of the engine.

10. A method as recited in claim 7 further comprising the step of determining the approximate speed of the rotor shaft of the turbocharger from the length of time that the crankshaft has been rotated.

11. A method as recited in claim 7 further comprising the step of generating power from the starter after the step of starting the engine.

12. A system for an automotive vehicle comprising:

an internal combustion engine having a crankshaft coupled to pistons;

a turbocharger having a rotor shaft;

a starter/alternator coupled to the crankshaft;

a controller coupled to the starter/alternator initiating the rotation of said crankshaft to displace air from the pistons and rotate the rotor shaft of said turbocharger, said controller starting said engine upon the rotor shaft reaching a predetermined speed.

13. A system as recited in claim 12 further comprising a fuel pump.

14. A system as recited in claim 13 wherein said controller operating said fuel pump during starting the engine.

15. A system as recited in claim 12 wherein said starter is a starter/alternator.

16. A system as recited in claim 12 further comprising a speed sensor coupled to the shaft of the turbocharger.

17. A system as recited in claim 12 further comprising a power inverter coupled to said starter.

18. A system as recited in claim 12 further comprising an energy storage device coupled to said power inverter.

* * * * *